F. CONRAD.
STARTING MECHANISM FOR GAS ENGINES.
APPLICATION FILED JULY 19, 1913. RENEWED JULY 2, 1920.

1,370,005.

Patented Mar. 1, 1921.
2 SHEETS—SHEET 2.

WITNESSES:
Fred A. Lind.
J. R. Longley

INVENTOR
Frank Conrad
BY
Wiley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING MECHANISM FOR GAS-ENGINES.

1,370,005. Specification of Letters Patent. Patented Mar. 1, 1921.

Application filed July 19, 1913, Serial No. 780,032. Renewed July 2, 1920. Serial No. 393,565.

*To all whom it may concern:*

Be it known that I, FRANK CONRAD, a citizen of the United States, and a resident of Pittsburgh, in the county of Allegheny and State of Pennsylvania, have invented a new and useful Improvement in Starting Mechanism for Gas-Engines, of which the following is a specification.

My invention relates to starting mechanisms for gas engines and particularly to such mechanisms as embody dynamo-electric machines which are to be employed as motors to start the gas engines of motor vehicles and, subsequently, as generators driven by the engines when the latter operate under their own power.

My invention has for one of its objects to provide a simple structure for connecting a dynamo-electric machine to an engine shaft, whereby different relative speeds are automatically obtained when operating respectively as a motor and as a generator.

Another object of my invention is to provide a simple and compact arrangement for combining ignition mechanism with the structure of the dynamo-electric machine and operating it in synchronism with the engine independently of the speed of the dynamo-electric machine.

In the use of motor generators to start the gas engines of automobiles, it is essential that small machines be used to avoid excessive weight. It is necessary to use reduction gearing to enable a small machine to operate as a motor at a high speed to develop the requisite torque to turn the engine shaft. When the engine starts under its own power, the dynamo-electric machine would be operated as a generator at an excessive speed if the same speed ratio were employed. It is necessary, therefore, to change the speed ratio for operation as a generator and it is highly desirable to effect the change at the moment the engine starts. Otherwise, the dynamo-electric machine may be damaged by the excessive speed before the operator has effected the change by manual operation.

I propose to arrange two sets of gear mechanisms having different speed ratios between the dynamo-electric machine and the engine shaft, one for starting and one for generation, the change from the one to the other being made automatically as the engine starts. The ignition mechanism is inclosed by the dynamo-electric machine casing and is operated by one of the above mentioned sets of gear mechanisms which has a fixed speed ratio with the engine shaft.

Figure 1:
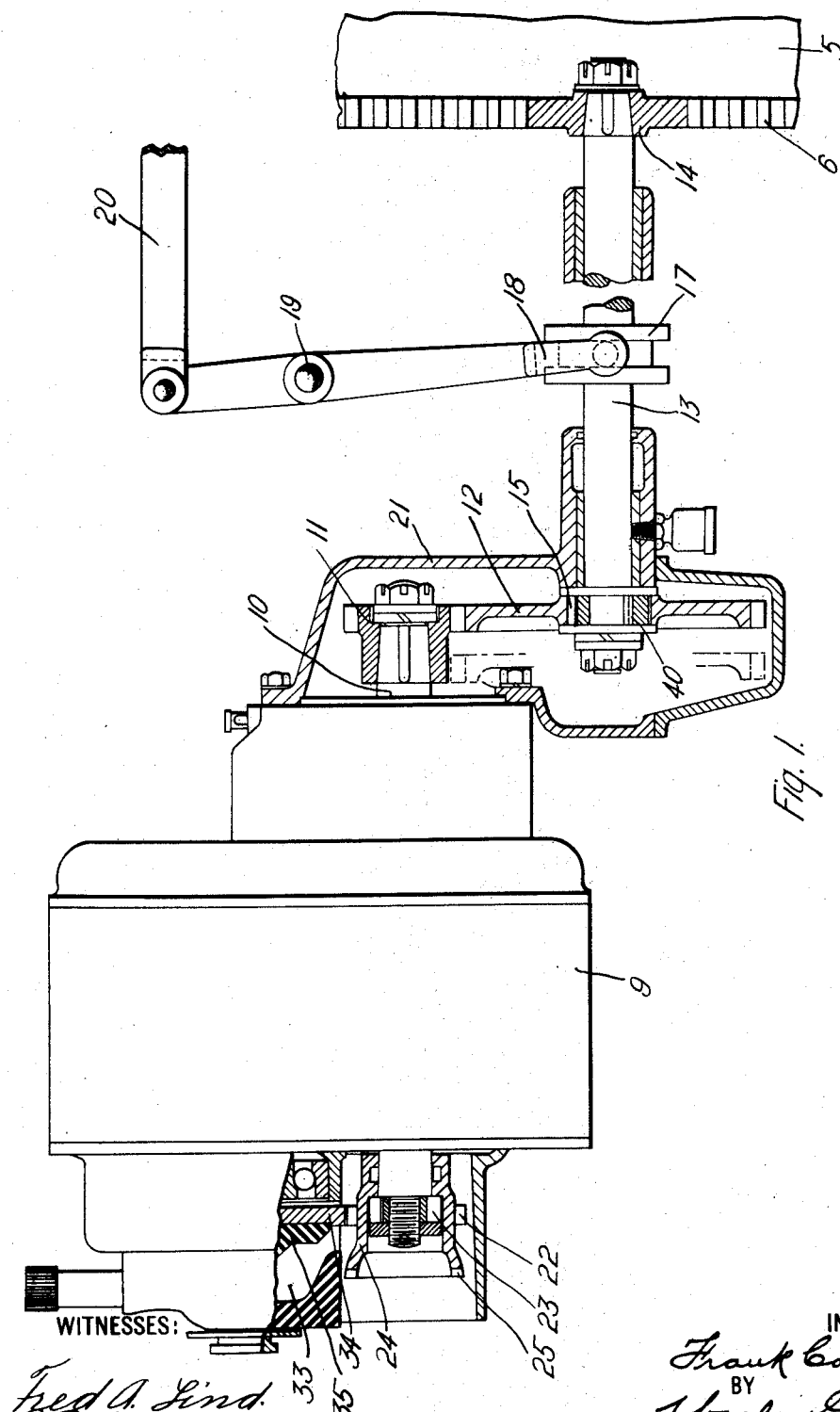
Figure 2:
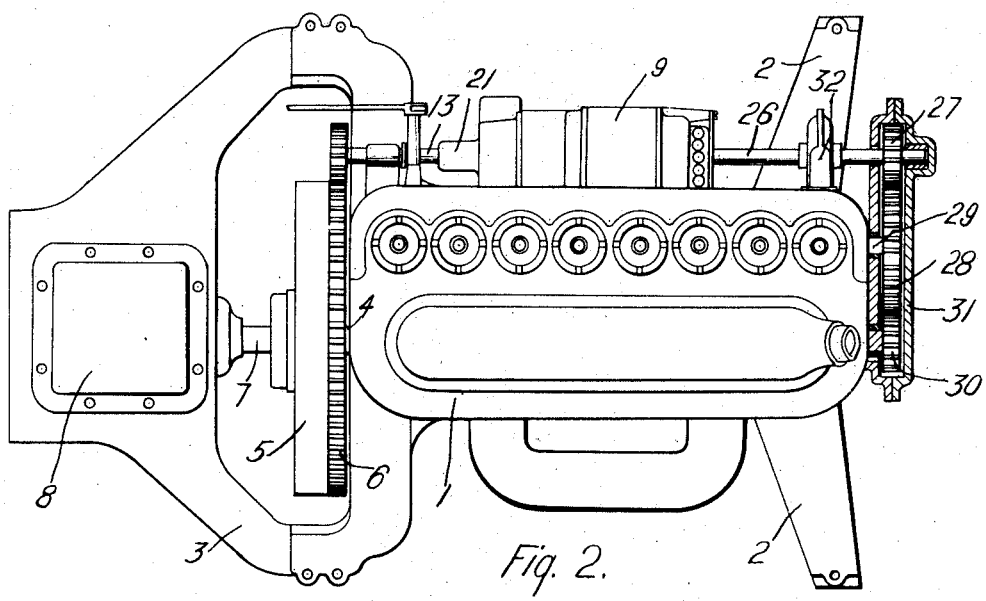
Figure 3:
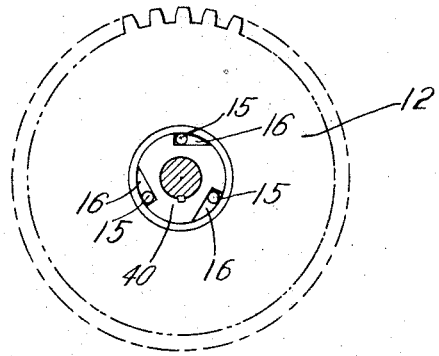

My invention will be more particularly described in accordance with the accompanying drawings in which Figure 1 is a side view, partially in elevation and partially in section, of a dynamo-electric machine arranged in accordance with my invention. Fig. 2 is a top view, partially in plan and partially in section, of a gas engine and related mechanism with my invention applied thereto. Fig. 3 is a detail view of a clutch.

An internal combustion engine 1 is provided with a supporting structure comprising arms 2 and frame members 3 which are adapted to be attached to the chassis of an automobile in any well known manner. The engine 1 comprises a shaft 4 and a fly wheel 5 that is provided with gear teeth 6 upon its periphery. The usual transmission shaft is indicated at 7 and the gear case into which it extends is indicated at 8. A dynamo-electric machine 9 is mounted upon any suitable supporting structure that is attached to the engine.

Referring particularly to Fig. 1, the armature shaft 10 of the dynamo-electric machine is provided, at its front end, with a fixed pinion 11. The pinion 11 is operatively connected to the fly wheel gear teeth 6 by means of a gear wheel 12, a slidable shaft 13 and a pinion 14. The gear wheel 12 is connected to the shaft 13 by a one-way clutch 40 of the roller type which is shown in detail in Fig. 3, and comprises rollers 15 mounted in inclined grooves 16.

The clutch is arranged to allow the shaft 13 to overrun the gear wheel 12. The pinion 14 is fixed on the shaft 13 and arranged to mesh with the gear teeth 6 substantially simultaneously with the meshing of the gear wheel 12 with the pinion 11 when the shaft 13 is shifted forwardly. The shaft 13 is provided with a grooved collar member 17 to be engaged by a yoke member 18 which has a pivotal support at 19. The yoke member 18 is actuated by a rod 20 which may be connected to any suitable pedal or lever (not shown) placed within convenient reach of the operator. The shaft 13 has a bearing in a housing 21 which incloses the end of the dynamo-electric machine, the pinion 11 and the gear wheel 12.

The opposite end of the armature shaft 10 is provided with a gear wheel 22 which is connected to the shaft 10 by a one-way roller clutch 23 that is similar to the clutch illustrated in Fig. 3. The clutch 23 is arranged to allow the armature shaft 10 to overrun the gear wheel 22. The gear wheel 22 is provided with a projecting flange 24 which has grooves 25 that are adapted to be engaged by suitable projections (not shown) on a shaft 26 for endwise connection with the same. As best shown in Fig. 2, the shaft 26 is connected, by means of gear wheels 27 and 28, to the engine cam shaft 29 and the latter is in turn connected to the engine shaft 4 through gear wheels 28 and 30. A housing 31 incloses the gear wheels 27, 28 and 30. As illustrated in the same view, a pump 32 is operated by the shaft 26 to circulate the water of the cooling system of the engine.

Referring again to Fig. 1, the motor generator 9 is provided with ignition mechanism indicated broadly at 33 which may comprise the usual devices for use in connection with gas engines. The details of the ignition mechanism form no part of my present invention. A gear wheel 34, which operates the timer or distributer disk 35, meshes with the gear wheel 22 which has a fixed speed ratio with the engine shaft. This construction insures that the ignition mechanism will be operated in synchronism with the engine shaft regardless of the speed of the armature shaft 10.

Normally, the slidable shaft 13 is in its left hand position with the gear wheel 12 in the position indicated by dotted lines (Fig. 1) and the pinion 14 disengaged from the fly wheel gear teeth 6. Assuming that the various parts are stationary and that it is desired to start the engine, the operator actuates the rod 20 to shift the shaft 13 forwardly and thereby effect the substantially simultaneous meshing of the gear wheel 12 with the pinion 11 and the pinion 14 with the gear teeth 6, respectively. The dynamo-electric machine is then operated as a motor through any suitable electrical connection (not shown) to rotate the engine shaft through the pinion 11, gear wheel 12, clutch 40, shaft 13, pinion 14 and fly wheel 5.

The speed ratio between the dynamo-electric machine and the engine shaft is, for example, approximately 18 to 1 when the engine is being started, although this ratio may be adapted to the relative sizes of the dynamo-electric machine and the engine. The reduction gear mechanism allows the dynamo-electric machine to rotate as a motor at a high speed. The gear wheel 22 which drives the ignition mechanism is rotated through the gear wheels 30, 28 and 27, and the shaft 26 at approximately the same speed as the engine saft, but much slower than the armature shaft 10, the clutch 23 allowing the armature shaft 10 to overrun the gear 22. When the engine starts under its own power, its speed will exceed that at which it is driven by the motor and the pinion 14 will therefore drive the shaft 13 faster than the gear wheel 12, the clutch 40 permitting the shaft 13 to overrun the gear wheel 12. When the gear wheel 22 reaches a speed equal to that of the armature shaft 10, the latter is driven through the clutch 23 at a ratio of approximately 1 to 1. The operator will ordinarily return the shaft 12 to its normal position as soon as possible after the engine starts but it will be clear that the change of speed ratio will occur automatically regardless of the position of the shaft 13. The return of the gear wheel 12 and the pinion 14 to their respective inoperative positions avoids the noise and wear incident to the rotation of idle parts.

It will be understood that such changes and modifications may be made in my invention as fall within the limits of the appended claims.

I claim as my invention:

1. The combination with an engine shaft, of a dynamo-electric machine comprising ignition mechanism, means for operatively connecting said dynamo-electric machine to said engine shaft at different speed ratios, said means comprising two trains of gear mechanism, each of said gear trains comprising clutch mechanism, and means whereby said ignition mechanism is driven by a part of one of said trains of gears at a fixed speed ratio with the engine shaft.

2. The combination with an engine shaft, of a dynamo-electric machine operable either as a motor or as a generator, timing mechanism mounted on the dynamo-electric machine, means for operatively connecting the dynamo-electric machine to the engine shaft to start the engine, and means for connecting the engine shaft to the timing mechanism and to the dynamo-electric machine to operate the latter as a generator including a one-way clutch, one member of which is operatively connected to the timing mechanism and another member of which is operatively connected to the armature shaft of the dynamo-electric machine.

3. The combination with an engine shaft, of a dynamo-electric machine having an armature shaft, means comprising a one-way clutch for connecting one end of the armature shaft to the engine shaft to start the engine, means comprising a one-way clutch for connecting the engine shaft to the other end of the armature shaft to operate the dynamo-electric machine as a generator, and ignition mechanism mounted on the dynamo-electric machine and operatively connected with a part of the last named connecting means.

4. The combination with an engine shaft, of a dynamo-electric machine having an armature shaft, means comprising a one-way clutch for connecting one end of the armature shaft to the engine shaft to start the engine, means comprising a one-way clutch for connecting the engine shaft to the other end of the armature shaft to operate the dynamo-electric machine as a generator, ignition mechanism, and means connecting said ignition mechanism and a part of said last named clutch so that the ignition mechanism will be driven at a fixed speed ratio with the engine shaft.

5. The combination with an engine shaft and a dynamo-electric machine having an armature shaft and comprising ignition mechanism, of means for operatively connecting said armature shaft to said engine shaft at a high-speed ratio, and means for operatively connecting said armature shaft to said engine shaft at a low-speed ratio, said last means comprising a gear wheel having a fixed-speed ratio with the engine shaft and operatively connected to said ignition mechanism, and a one-way clutch between said gear wheel and said armature shaft.

In testimony whereof, I have hereunto subscribed my name this 17th day of July 1913.

FRANK CONRAD.

Witnesses:
 OTTO S. SCHAIRER,
 B. B. HINES.